3,819,800
ALKALI METAL CHROMATE PRODUCTION
Kenneth F. Shaffer and Irvin G. Arnold, Jr., Wilmington, N.C., assignors to Diamond Shamrock Corporation, Cleveland, Ohio
No Drawing. Filed Aug. 28, 1972, Ser. No. 284,042
Int. Cl. C01g 37/14
U.S. Cl. 423—58                                6 Claims

ABSTRACT OF THE DISCLOSURE

Chromite ore is roasted in the presence of small amounts of lime, slurried with water and the slurry acidified to a sufficient degree to precipitate alumina hydrate. When the slurry is subsequently filtered, the filtrate comprises a high purity alkali metal chromate.

BACKGROUND OF THE INVENTION

Alkali metal chromate is conventionally produced by roasting finely-divided, e.g., 150 to 200 mesh, chromite ore in the presence of oxygen and in admixture with an alkali metal carbonate and lime. The purpose of the carbonate is to react with chromium in the ore and provide water soluble salts thereof, while the lime improves roasting characteristics of the mix and reduces the amounts of nonchromium water soluble salts formed during the roasting process. The roasting operation is carried out at a temperature ranging between 1100° and 1150° C., in a rotary kiln or other convenient roasting means, after which the roast is cooled and slurried with water resulting in a leaching of various soluble alkali metal salts from the insoluble residue. The slurry is then filtered, the residue often being dried and recycled to the kiln, and the filtrate acidified to within the range of 8.5–9.0 in order to precipitate alumina hydrate, which is filtered off and discarded. Often this second filtrate is further treated with lime to reduce the vanadium content of the chromate liquor.

Various problems are known to exist with the foregoing procedure. For example, when relatively large amounts of lime are present in the roast mixture, a considerable amount of chromate is lost in the first filter cake owing to its presence in the form of insoluble calcium chromate. Further, even with careful control of pH during acidification, the physical form of the aluminum hydrate is such as to render filtration difficult. On the other hand, if a low enough lime concentration is employed to avoid calcium chromate losses, a second addition of lime is necessary to avoid unacceptably high vanadium concentrations in the chromate liquor.

STATEMENT OF THE INVENTION

Therefore, it is an object of the present invention to provide an improved method for the preparation of high purity alkali metal chromates.

This and further objects of the present invention will become apparent to those skilled in the art from the specification and claims which follow.

A process has now been found for converting chromite ore into alkali metal chromate having a low vanadium content, which process consists essentially of:

(A) roasting a mixture of pulverized chromite ore, alkali metal carbonate and from 2 to 10 parts by weight, per 100 of ore, of lime;
(B) forming a slurry of the roasted product with water.
(C) lowering the pH of the slurry to a value at which alumina hydrate is precipitated;
(D) filtering the slurry; and
(E) recovering the filtrate containing the alkali metal chromate.

Preferably, the slurry, prior to acidification, is divided into two portions, the first containing fine residue and the second containing coarse residue, the second portion being filtered, the filtrate added to the first portion and the coarse residue optionally recycled to the roasting step.

Such a process presents a number of advantages as compared to the prior art. For instance, it is possible to significantly reduce the amount of lime employed in the roasting step, thus reducing the materials cost while improving the physical characteristics of the roast mix in the kiln. Further, this reduced lime content lessens the loss of chromate as insoluble calcium chromate in the filtration step. However, since lime is still present during the acid precipitation, it is not necessary to subsequently add same to the chromate-containing filtrate in order to remove the vanadium. In addition, acidification of the slurry in the presence of the residue results in an alumina hydrate having physical characteristics which facilitate the filtration step considerably. Significantly, the vanadium content of the product liquor is on the order of 0.01 percent, a value lower than obtainable by most, even more complex, processes.

Optimum operation of the low lime process depends on the recycle of residue to the kiln, such residue improving roast characteristics. For this reason, separation of the slurry into two portions prior to acidification is preferred, the coarse residue being filtered off and recycled. Since this coarse material is found to contain the major portion of unreacted chromium, a further advantage obtains.

DESCRIPTION OF THE PREFERRED EMBODIMENTS

The actual roasting step is conventional, as described hereinabove, with the exception that the amount of lime present is considerably reduced from the prior art (which employs from 25–60 parts, per hundred of ore) to within the range of from 2 to 10 parts by weight. It will be understood that the importance of the lime is its calcium oxide component and, therefore, other sources of same may be employed.

As the roasted material exits from the kiln, it is contacted with a sufficient amount (e.g., equal volume) of water to form a slurry and dissolve the soluble alkali metal salts. While this slurry may be transferred directly to the acidification step for precipitation of the alumina hydrate, preferably it is divided by mechanical means (such as a hydroclone, rake classifier or other device known to the art) into two portions, the first portion comprising a slurry of fine residue, that is, having a particle size of less than about 75 microns, and the second portion containing the coarse residue (balance). It has been found that this coarse residue contains nearly twice the amount of unreacted chromium values and, therefore, is economically suitable for recycle to the kiln, wherein its presence also serves to improve the physical characteristics of the roast mixture. Prior to this recycle, if any, the second portion is filtered and the filtrate combined with the first portion, containing both liquor and fine residue, for further treatment.

At this point, a source of acid is added to the slurry to precipitate aluina hydrate. Of primary importance in this operation is that the alumina hydrate be precipitated in a particle configuration suitable for rapid and efficient filtration. It has been found that this may be optimized by control of a number of variables. Perhaps most important is that the precipitation takes place in the presence of residue from the roasting step. While it is not known exactly why, it has been observed that the presence of this residue has an extremely desirable effect upon the formation and removal of the alumina hydrate.

Of course, as noted above, since the residue also contains lime from the roasting step, reduction of the pH to within the below-stated range (i.e., that at which alumina hydrate precipitates) also results in the precipitation of insoluble vanadium compounds. The acidification may employ a variety of materials, although generally an alkali metal bichromate solution is used. Optionally, sulfuric acid or other acid sources may be employed. The optimum pH has been found to lie within the range of from 8.2–8.8. It has also been found desirable to control the temperature of the slurry during the precipitation to within the range of 80–100° C. Further, to facilitate distribution and contact, the slurry should be vigorously agitated, by any conventional means, during addition of the acid.

The final step comprises filtration of the residue-precipitate slurry to yield an aqueous alkali metal chromate liquor which generally contains on the order of 0.01 percent or less, vanadium, measured as vanadium pentoxide on an alkali metal chromate basis. The filter cake, containing the alumina, the residue from the roast mix and only small amount of unreacted chromium, may be discarded.

In order that those skilled in the art may more readily understand the present invention and a preferred embodiment by which it may be carried into effect, the following specific example is afforded.

EXAMPLE

A mixture of 23 parts by weight anhydrous $Na_2CO_3$, 1.0 part lime, 50 parts of recycled residue and 26 parts of chromite ore having a particle size such that 99.5% passes through a 100 mesh (U.S. standard) screen and containing 45% $Cr_2O_3$ and 13% $Al_2O_3$, is fed to a rotary kiln maintained at a temperature of 1100° C. Average residence time in the oxidizing (air) atmosphere is 4 hours, following which the mix is slurried in an equal volume of water with vigorous agitation. The slurry is then passed through a hydroclone separator (wet cyclone) wherein the slurry portion containing unreacted residue having a particle size of less than about 75 microns (fine residue) is separated from the slurry containing the remaining (coarse) residue (70% less than 150 microns). The coarse residue slurry is filtered, with the residue being dried and recycled to the kiln, while the filtrate is combined with the fine residue slurry. Maintaining the temperature at about 90° C., the slurry is then acidified with 70% aqueous sodium bichromate liquor to a pH of about 8.5, thus causing alumina hydrate to precipitate from solution. On filtration, which proceeds rapidly and efficiently, a sodium chromate liquor having a $V_2O_5$ content, on a $Na_2Cr_2O_4$ basis, of less than 0.01% is obtained. The amount of $Cr_2O_3$ lost in the filter cake is less than 10% of its original presence.

Although the invention has been described with reference to certain preferred embodiments thereof, it is not to be so limited since changes and alterations may be made therein, while still remaining within the intended scope of the appended claims.

We claim:

1. A process for converting chromite ore into alkali metal chromate having a low vanadium content, which process consists essentially of:
   (A) roasting a mixture of pulverized chromite ore, alkali metal carbonate and from 2 to 10 parts, per 100 of ore, of lime;
   (B) forming a slurry of the roasted product with water;
   (C) lowering the pH of the slurry to within 8.2 to 8.8;
   (D) filtering the slurry; and
   (E) recovering the filtrate containing the alkali metal chromate.

2. A process for converting chromite ore into alkali metal chromate having a low vanadium content, which process consists essentially of:
   (A) roasting a mixture of pulverized chromite ore, alkali metal carbonate and from 2 to 10 parts, per 100 of ore, of lime;
   (B) forming a slurry of the roasted product with water;
   (C) lowering the pH of the slurry to within 8.2–8.8 while maintaining a temperature within the range 80° to 100° C.;
   (D) filtering the slurry; and
   (E) recovering the filtrate containing the alkali metal chromate.

3. A process for converting chromite ore into alkali metal chromate having a low vanadium content, which process consists essentially of:
   (A) roasting a mixture of pulverized chromite ore, alkali metal carbonate and from 2 to 10 parts, per 100 of ore, of lime;
   (B) forming a slurry of the roasted product with water;
   (C) separating the slurry into a first portion containing fine residue having a particle size less than about 75 microns and a second portion containing coarse residue having a particle size greater than about 75 microns;
   (D) filtering the second portion;
   (E) adding the filtrate to the first slurry portion;
   (F) lowering the pH of the slurry to within 8.2 to 8.8;
   (G) filtering the slurry; and
   (H) recovering the filtrate containing the alkali metal chromate.

4. A process as in claim 3 wherein the temperature of the slurry during acidification in step (F) is maintained within the range of 80° to 100° C.

5. A process for converting chromite ore into alkali metal chromate having a low vanadium content, which process consists essentially of:
   (A) roasting a mixture of pulverized chromite ore, alkali metal carbonate and from 2 to 10 parts, per 100 of ore, of lime;
   (B) forming a slurry of the roasted product with water;
   (C) separating the slurry into a first portion containing fine residue having a particle size less than about 75 microns and a second portion containing coarse residue having a particle size greater than about 75 microns;
   (D) filtering the second portion;
   (E) recycling at least a portion of the coarse residue remaining after filtration to the roasting step for admixture;
   (F) adding the filtrate to the first slurry portion;
   (G) lowering the pH of the slurry to within 8.2 to 8.8;
   (H) filtering the slurry; and
   (I) recovering the filtrate contataining the alkali metal chromate.

6. A process as in claim 5 wherein the temperature of the slurry during acidification in step (F) is maintained within the range of 80° to 100° C.

References Cited
UNITED STATES PATENTS

| | | | |
|---|---|---|---|
| 3,314,747 | 4/1967 | Carlin | 423—58 |
| 1,948,143 | 2/1934 | Tarr | 423—61 |
| 3,137,541 | 6/1964 | Cooke | 423—58 X |
| 2,839,359 | 6/1958 | Dunning | 423—58 |
| 2,612,435 | 9/1952 | Perrin et al. | 423—58 |
| 2,587,552 | 2/1952 | Vedensky | 423—58 |
| 2,583,591 | 1/1952 | Perrin et al. | 423—58 X |

HERBERT T. CARTER, Primary Examiner

U.S. Cl. X.R.

423—61